United States Patent Office
3,234,196
Patented Feb. 8, 1966

3,234,196
PREPARATION OF LITHIUM SUBSTITUTED POLYSTYRENE POLYMERS
Frederick C. Leavitt, Framingham, Mass., assignor to The Dow Chemical Company, Midland, Mich., a corporation of Delaware
No Drawing. Filed Mar. 23, 1961, Ser. No. 97,756
9 Claims. (Cl. 260—93.5)

This application is a continuation-in-part of Serial No. 863,080, filed Dec. 31, 1959.

This invention relates to the preparation of polymers whether they be homopolymers or copolymers, of random or controlled polylmerization, wherein the basic polymeric structure is formed so that it contains a certain number of lithium atoms, which are thereafter reactable with a variety of reagents making it possible to graft side chains with functional groups onto the polymer structure. More particularly, therefore, the invention is concerned with the formation of polymers which carry side chains and have structures representing unique and hitherto unobtainable combinations of chemical moieties in the combinations of side chains which can be engrafted onto the polymer chain.

For many purposes it is desirable to have a basic polymer structure which is modified by the inclusion of other side chains in that structure. For example it is desirable at times to form certain kinds of hybrid polymers. In general, efforts to accomplish these results have taken the direction of various combinations of copolymers and with more or less indifferent success. It is, accordingly, a fundamental object of this invention to provide means by which precise tailormade polymer and copolymer structures can be formulated.

It is another object of the invention to provide a method for grafting certain kinds of side chain moieties onto known kinds of fundamental polymer structures.

Other objects and advantages of the invention will in part be obvious and in part appear hereinafter.

This invention accordingly is embodied in a process for the preparation of homopolymers or copolymers of two or more monomeric units wherein an intermediate polymer structure is prepared, characterized by the fact that the backbone carries reactive lithium atoms thereon which can be reacted with a variety of reagents to engraft side chains of functional groups onto the fundamental polymer structure. Such reagents include isocyanates to form amides, acid chlorides to form ketones, ketone groups to form alcohols, benzyl halides to form aryl hydrocarbon groups, epichlorohydrins to give epoxide type polymers, and epoxides to form alcohols, etc. That is the fundamental process involved may be summarized as follows:

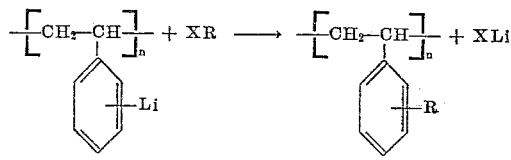

wherein $n$ is an integer representing the degree of polymerization and having a value up to 10,000, R is a generalized representation for any of the moieties indicated and X likewise is the generalized representation of the reactive unit with Li.

It will be seen from this general equation, especially in the rendition of the generalized product, that there are a number of kinds of polymers which are difficult to prepare and that through the preparation of the fundamental lithiated polymeric chain herein defined, the route outlined herein is made direct. For example, polystyrene-type compounds carrying bulky substituent groups in ortho positions on the benzene rings can be prepared conveniently by this method.

Accordingly, the process fundamentally consists of the preparation of a fundamental prepolymer carrying lithiated organo groups, wherein the organo lithium group can be reacted with any of a variety of compounds to prepare other substituted polymer units. The process involves carrying out the reaction in appropriate solvents having low temperature range from about —40° to about 40° C.

In the preparation of modified polymers by chemical treatment using known reactions such as halogenation, acylation or alkylation, etc., the position of entry of the moiety onto the chain cannot be chosen at will. With the present method, the exact determination of reaction position is possible. Conditions of reaction for the present invention are relatively mild, e.g., room temperature, or below, whereas other known reactions for polymer modification often require strenuous conditions.

Details of the process for preparing the modified polymers will be better understood by reference to the following:

*Example I*

One gram of a copolymer of o-bromo styrene and styrene (20.8% Br) is dissolved in 100 milliliters anhydrous tetrahydrofuran. An atmosphere of dry $N_2$ is maintained throughout. A 2.5 N solution of n-butyl lithium in hexane is slowly added in excess (20 milliliters) at —40° C. with stirring. After one-half hour at —40° C., phenyl isocyanate is slowly added in sufficient quantity to provide one mole for every mole of BuLi added previously. After a short period (~10 minutes) the reaction vessel is warmed to room temperature, contents neutralized and the polymer recovered by standard reprecipitation techniques. The polymer now contains <1% Br and 2.7% N as well as having a carbonyl absorption in the IR spectrum.

For the polymer backbone, the ortho, meta, and para-lithio derivatives of polystyrene have been used, and of such copolymers with styrene. These have been reacted with phenyl isocyanate, benzoylchloride, epichlorohydrin, vinylbenzylchloride, styrene, isoprene, styrene oxide, acetone, ethyl chloroformate. These reactions are illustrated in the following examples, in which, reaction conditions, i.e., solvent, temperature, manipulation, paralleled those of Example I:

*Example II*

Using a copolymer of styrene and o-bromostyrene to give

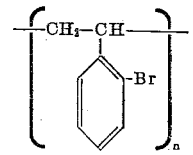

wherein the Br is on roughly 50% of the phenyl groups, and $n$ is an integer, making the molecular weight about 5000, the polymer is reacted with butyl lithium to put lithium on the phenyl ring; and thereafter the polymer is reacted with ethyl chloroformate to give a polymer carrying the following moiety:

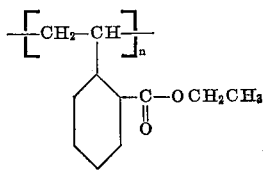

The newly formed ester-containing polymer will have increased solubility in polar solvents such as acetone, methyl ethyl ketone, etc.

Example III

Following the procedure of Examples I and II (but using para bromo styrene, rather than ortho bromo styrene, as the starting polymer) and reacting the lithiated polymer with epichlorohydrin, the following result is obtained:

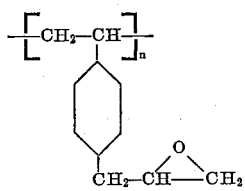

This epoxidized polymer may now be reacted with amines, alcohols, acid anhydrides, etc., to cross link the system or build in other functional groups.

Example IV

Following the procedure of Examples I and II (using para bromostyrene) and reacting the lithiated polymer with an isocyanate, e.g., phenyl isocyanate, the following result is obtained:

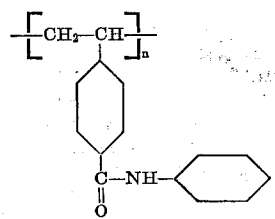

Such modification will lead to intramolecular or intermolecular forces through hydrogen bonding of the amide groups. This improves the heat resistance of the polymer and decreases solubility in non-polar solvents.

Example V

Following the procedure of Examples I and II (using para bromo styrene) and using vinyl benzyl chloride the following results:

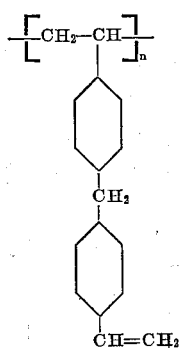

This vinylated product may be used as an ingredient in polyester resins (or paints which contain drying oils) and be crosslinked through further vinyl polymerization.

Example VI

Following the procedure of Examples I and II (using para bromo styrene) and using styrene oxide the following result is obtained:

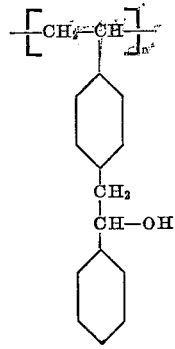

This resin has a higher dielectric constant than polystyrene and increased solubility in polar solvents such as acetone, isopropanol, etc.

Example VII

Following the procedure of Examples I and II and using acetone the following result is obtained:

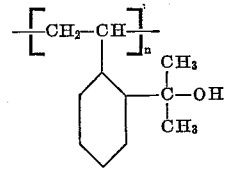

This resin also has a higher dielectric constant than polystyrene and increased solubility in polar solvents such as acetone, isopropanol, etc.

Example VIII

Following the procedure of Examples I and II (using para isomer) and using isoprene monomer to form a polymeric side chain, the following result is obtained:

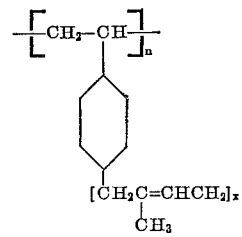

$x = 1-1000$.

This is a more resilient material than polystyrene with application in the high-impact strength plastics field.

In carrying out the process, temperature must be held low enough so that the lithiated polymer does not react with the solvent. In this respect choice of solvent is also a consideration. Generally the more inert solvents such as tetrahydrofuran, diethyl ether-benzene mixtures, and dimethyl ether of ethylene glycol, etc., are preferred. However, if the temperature is very low, e.g., below —80° C., the reaction will be very slow. Time is relatively unimportant and depends on the temperature. Pressure is not necessary.

The polymers which are prepared in accordance with the process of this invention, it will be seen, remain fundamentally of the composition of the parent starting material. Also, the physical properties of the starting or basic polymer are retained. The usefulness of the process is in the fact that it makes possible the incorporation of modifying groups of side chains into the basic structure, thereby extending the usefulness of the polymers by virtue of the fact that they can be used as cross linking agents in polymeric mixtures, or by modifying the fundamental properties of the polymer. For example, styrene polymers have their solubilities altered by the incorporation of moieties such as those described. In other situations the dielectric constants are modified. In this fashion the basic polymer retains its fundamental usefulness, but with a modification or emphasis in a functional direction.

In my copending application Serial No. 863,080, filed December 31, 1959, I have described a process for the preparation of lithiated polymers, which is useful for the purposes of this invention.

Despite the fact the invention has been described in terms of only a limited number of examples, it is to be understood that it may be varied in detail without departing from the spirit or scope thereof.

What is claimed is:

1. The method for forming polymers comprising reacting a polystyrene having lithium substituent groups in the phenyl nucleus of said polystyrene, with a co-reactant selected from the group consisting of phenyl isocyanate, the benzoyl group, epihalohydrin compounds vinylbenzylhalides, styrene, isoprene, styrene oxide, acetone, and alkylchloroformate esters, in a solvent at a temperature between —80° C. and 40° C. in an inert atmosphere, and thereafter neutralizing and recovering the polymer as the end product.

2. The method of forming a polymer in accordance with claim 1 carrying moieties corresponding to the following structure:

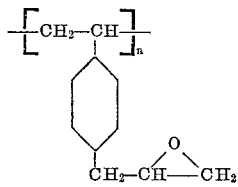

wherein para lithio styrene is reacted with epichlorohydrin to produce said structure.

3. The method of forming a polymer in accordance with claim 1 carrying moieties corresponding to the following structure:

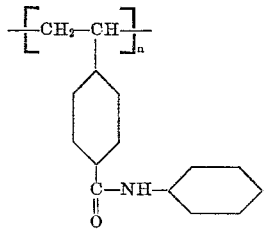

wherein para lithio styrene is reacted with phenyl isocyanate to produce said structure.

4. The method of forming a polymer in accordance with claim 4 carrying moieties corresponding to the following structure:

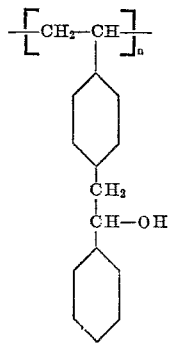

wherein para lithio styrene is reacted with styrene oxide to produce said structure.

5. The method of forming a polymer in accordance with claim 1 carrying moieties corresponding to the following structure:

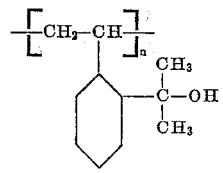

wherein ortho lithio styrene is reacted with acetone to produce said structure.

6. The method of forming a polymer in accordance with claim 1 carrying moieties corresponding to the following structure:

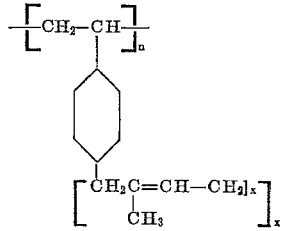

wherein para lithio styrene is reacted with isoprene monomer to form a polymeric side chain, to produce said structure.

7. The method of forming a polymer in accordance with claim 1 carrying moieties corresponding to the following structure:

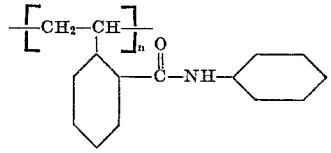

wherein ortho lithio styrene is reacted with phenyl isocyanate to produce said structure.

8. The method of forming a polymer in accordance with claim 1 carrying moieties corresponding to the following structure:

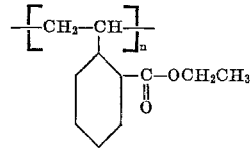

wherein ortho lithio styrene is reacted with ethyl chloroformate to produce said structure.

9. The method of forming a polymer in accordance with claim 1 carrying moieties corresponding to the following structure:

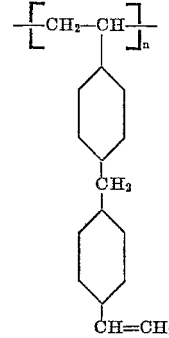

wherein para lithio styrene is reacted with vinyl benzyl chloride to produce said structure.

(References on following page)

References Cited by the Examiner

UNITED STATES PATENTS 3,135,716   6/1964   Uraneck _____ 260—87.5
3,177,190   4/1965   Hsieh _____ 260—94.2

OTHER REFERENCES

Boundy et al.: "Styrene, Its Polymers, Copolymers and Derivatives," Reinhold Publishing Corp., New York, 1952, page 755.

JOSEPH L. SCHOFER, *Primary Examiner.*

WILLIAM H. SHORT, J. E. CARSON, JOHN F. McNALLY, *Assistant Examiners.*